United States Patent Office 3,799,924
Patented Mar. 26, 1974

3,799,924
ESTER CLEAVAGE PROCESS
Billy G. Jackson, Indianapolis, Ind., assignor to Eli Lilly
and Company, Indianapolis, Ind.
No Drawing. Filed Dec. 18, 1970, Ser. No. 99,697
Int. Cl. C07d 99/24
U.S. Cl. 260—243 C                                    8 Claims

ABSTRACT OF THE DISCLOSURE

This invention is addressed to an improved method for converting the p-nitrobenzyl esters of $\Delta^3$-cephalosporin acids to the corresponding acid wherein the ester is reacted with a dithionite under basic conditions.

---

This invention relates to $\Delta^3$-cephalosporin compounds, and more particularly to a new and improved process for converting $\Delta^3$-cephalosporin acid p-nitrobenzyl esters to the corresponding $\Delta^3$-cephalosporin acids.

The semi-synthetic production of 7-acylamidodesacetoxycephalosporin antibiotics from penicillin starting materials has become of importance recently, due to the process invention of Morin and Jackson (U.S. Pat. No. 3,275,626) who describe and claim a process for converting penicillin sulfoxide esters to desacetoxycephalosporanic acid esters and to the improvements on that Morin-Jackson process by Chauvette and Flynn (U.S. application Ser. No. 574,311, filed Aug. 23, 1966) who found that certain esters of the penicillin starting materials and of the resulting desacetoxycephalosporin ester products were more useful in the process in that they were more easily cleaved than those employed by Morin and Jackson. Further improvements of the Morin-Jackson process were claimed by Robin D. G. Cooper (U.S. applications Ser. Nos. 636,629, 636,593 and 636,592, all filed May 8, 1967) who found that the use of certain solvents directed the heat rearrangement of the penicillin sulfoxide esters more specifically toward production of the corresponding desacetoxycephalosporin esters and permitted the use of lower temperatures. Some of the 7-acylamidodesacetoxycephalosporanic acid compounds have been found to have unique properties as antibiotics in their own right. For example, cephalexin, 7-[D-alpha-aminophenylacetamido]-3-methyl - $\Delta^3$ - cephem-4-carboxylic acid zwitterion and pharmaceutically acceptable cationic and anionic salt forms thereof are useful as oral antibiotics in combatting infections caused, e.g., by pencillin resistant strains of *Staphylococcus aureus*, and many other Gram-positive and Gram-negative micro-organisms.

The reaction which occurs during the ring expansion process of Morin and Jackson described above can be illustrated by the following equation

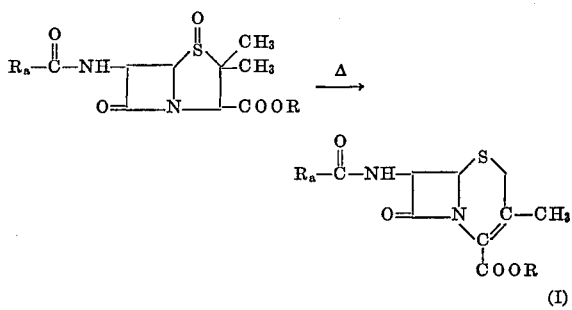

wherein $R_a$ is the residue of the acylamido group and R is the residue of an ester forming alcohol. Thus, both the starting material and the product are in the form of an ester.

One of the esters preferred for use in the Morin-Jackson ring expansion is the p-nitrobenzyl ester. However, in the production of desacetoxycephalosporin antibiotics, it is necessary to cleave the ester group to form the corresponding acid since the ester form has little or no antibiotic activity. At the present time, the p-nitrobenzyl esters of $\Delta^3$-desacetoxycephalosporins are cleaved by means of metallic zinc or elemental hydrogen under acid conditions. However, such methods for cleaving the p-nitrobenzyl esters result in the concomitant production of an insoluble material which complicates the isolation and recovery of the desired $\Delta^3$-desacetoxycephalosporanic acid.

It is accordingly an object of the present invention to provide a new and improved process for converting $\Delta^3$-cephalosporin p-nitrobenzyl esters to the corresponding acid without the production of undesired by-products.

It is a related object of the invention to provide a new and improved process for cleaving p-nitrobenzyl esters of $\Delta^3$-cephalosporin acids to form the corresponding acid in high yields.

The concepts of the present invention reside in a process in which p-nitrobenzyl esters of $\Delta^3$-desacetoxycephalosporanic acids, 3 - alkylthiomethyl $\Delta^3$ - cephalosporanic acids or 3-alkoxymethyl $\Delta^3$-cephalosporanic acids are cleaved to form the corresponding acid by reacting the p-nitrobenzyl ester with a dithionite under basic conditions. It has been found that the use of a dithionite provides an efficient ester cleavage reaction without the concurrent production of insoluble organic material as has been experienced with the use of zinc or hydrogen.

As the dithionite, use is preferably made of the dithionites of the alkali metals, such as sodium dithionite, potassium dithionite, lithium dithionite, etc., although use can be made of any of a variety of other dithionite salts known to those skilled in the art.

As indicated above, the reaction is carried out under basic conditions, that is at a pH greater than 7. The pH of the reaction mixture can conveniently be adjusted by the use of any bases which is not reactive with the reactants. Representative of suitable bases are alkali metal hydroxides (e.g., sodium hydroxide, potassium hydroxide, lithium hydroxide, etc.), ammonium hydroxide, etc., as well as organic bases including secondary and tertiary amines (e.g., triethylamine, diethylamine, tripropylamine, dipropylamine, pyridine, morpholine, piperidine, etc.).

The reaction is preferably carried out in the presence of an inert solvent, although it is sometimes desirable to use the organic base as the solvent. Suitable solvents include water, alkanols (methanol, ethanol, isopropanol, etc.), aliphatic ketones (e.g., acetone, methyl ethyl ketone, etc.), chlorinated hydrocarbons (e.g., chloroform, methylene chloride, carbon tetrachloride, dichloroethane, etc.), aliphatic nitriles (e.g., acetonitrile) as well as a wide variety of others. As will be understood by those skilled in the art, mixtures of solvents of the foregoing types may also be employed.

The reaction temperature is not critical and can be varied within wide limits. For best results, use is made of a reaction temperature within the range of $-20$ to $100°$ C., and preferably $0°$ to $50°$ C.

Similarly, the amount of the dithionite employed is not critical to the practice of the invention. In general, use should be made of at least one mole of the dithionite per mole of the cephalosphoranic acid ester in the reaction mixture. For best results, use should be made of the dithionite in a mole ratio of 3 to 6 moles of dithionite per mole of ester, with excess quantities of the dithionite being preferred to drive the reaction to completion.

As the Δ³-cephalosporin acid p-nitrobenzyl ester, use is preferably made of a compound having the formula

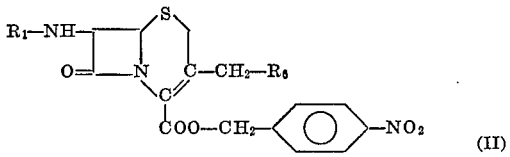

wherein $R_1$ is hydrogen or an amino protecting group, and preferably an acyl group and $R_6$ is hydrogen, alkylthio in which the alkyl group contains 1 to 6 carbon atoms (e.g., methylthio, ethylthio, isopropylthio, butylthio, etc.) or alkoxy containing 1 to 6 carbon atoms (e.g., methoxy, ethoxy, propoxy, etc.). Since the various R groups are not involved in the reaction, any of a variety of acyl groups, which are now well known in the penicillin and cephalosporin antibiotic literature may, be used in the practice of this invention.

Illustrative of suitable acyl groups which can be present in the starting materials treated in accordance with the practice of the invention include those acyl groups having the formula

wherein $n$ is zero or an integer from 1 to 6 and $R_2$ is an organic group such as an aryl group or a substituted aryl group containing 6–14 carbon atoms.

Preferred aryl groups are those derived from benzene or naphthalene

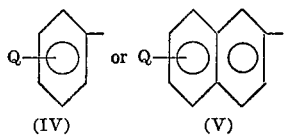

wherein Q is hydrogen or one or more substituents including, for example, $C_1$ to $C_3$ alkyl (e.g., methyl, ethyl, propyl, isopropyl, $C_1$ to $C_3$ alkoxy (e.g., methoxy, ethoxy, propoxy, etc.), a cyano group, a nitro group, a hydroxy group, halogen (e.g., chlorine, fluorine, bromine and iodine), a trifluoromethyl group, a carboxy group, an amino group, a $C_1$ to $C_4$ carboxyalkyl group, a carboxamidoalkyl group [$H_2N$-C(O)-alkyl] (e.g., carboxamidomethyl, carboxamidoethyl, etc.).

Representative of the above acyl groups are benzoyl, phenylacetyl, beta-(phenyl)propionyl, naphthoyl, naphthylacetyl, gamma-phenylbutryryl, p-methylbenzoyl, 2,4-dimethylphyenylacetyl, 5-methoxynaphthylacetyl, p-cyanophenylacetyl, 4-nitronaphthoyl, 3-nitrobenzoyl, 3,5-dicyanonaphthylacetyl, beta-(3-nitrophenyl)propionyl, p-hydroxybenzoyl, 4-hydroxyphenylacetyl, p-chlorophenylacetyl, m-bromobenzoyl, 3-trifluoromethylphenylacetyl, o-carboxyphenylacetyl, m-carboxymethylphenylacetyl, m-carboxamidomethylphenylacetyl, beta(5-carboxamidomethyl naphthyl) propionyl, aminobenzoyl, aminophenylacetyl as well as a number of others.

$R_2$ can also be a cycloalkyl group containing 4-8 carbon atoms, including cyclobutyl, cyclopentyl, cyclohexyl, cycloheptyl, etc. In addition, $R_2$ can also be one of the foregoing cycloalkyl groups which is substituted by one or more of the Q substituents described above.

Illustrative of such acyl groups include cyclopentanoyl, cyclohexanoyl, 3-methylcyclohexanoyl, cyclobutylcarbonyl, 2-methoxycyclohexanoyl, 3-chlorocyclohexylacetyl, cyclopentylacetyl, beta-cyclopentylpropionyl, 3-methoxycyclohexanoyl, 2-cyanocyclopentylacetyl, 3-nitrocyclohexanoyl, 3-carboxycyclohexylacetyl, 3-carboxamidomethylcyclohexylacetyl, etc.

$R_2$ can also be a heterocyclic group wherein the heteroatom is O, S, N or any combination thereof, including dioxanyl, 2-furyl, 3-furyl, imidazolyl, isoxazolyl, morphorinyl, oxazolyl, pyranyl, pyrazinyl, pyrazolyl, N-pyridyl, 2-pyridyl, 3-pyridyl, pyrimidyl, N-pyrryl, 2-pyrryl, 3-pyrryl, thiazolyl, 2-thienyl, 3-thienyl, 2-benzothienyl, 3-benzothienyl, triazinyl, triazolyl and the like; the partially and completely hydrogenated derivatives of the foregoing, such as tetrahydrofuryl, imidazolinyl, imidazolidyl, piperidyl, tetrahydropyrimidyl, pyrrolidyl and the like; as well as all of the foregoing group which are substituted by one or more of the Q groups described above, as represented by the picolyls, methylfuryls, methyl thienyls, nitrofuryl, cyanofuryl, nitrobenzothienyl, nitropyridyl, cyanopyridyl, methoxypyrimidyl, bromopyridyl, trifluoromethyl pyridyl as well as a variety of others as described in Flynn U.S. Pat. No. 3,218,318.

Illustrative of acyl groups when $R_2$ is heterocyclic are dioxanylacetyl, 2-furylcarbonyl, beta-pyrazinylpropionyl, 2-pyridylacetyl, 3-pyridylcarbonyl, 2-thienylacetyl, 3-benzothienylcarbonyl, piperidylacetyl, pyrrolidylcarbonyl, nitrobenzothienylacetyl, beta-(nitrofuryl)-propionyl, cyanopyridylcarbonyl, etc.

$R_1$ can further be an acyl group having the general formula

wherein $R_3$ is either alkyl containing 1–8 carbon atoms (e.g., methyl, ethyl, isopropyl, n-butyl, tert-butyl, hexyl, isooctyl, etc.) or alkenyl containing 2 to 8 carbon atoms (e.g., vinyl, allyl, 2-butenyl, 3-hexenyl, etc.). $R_3$ can also be one of the foregoing alkyl or alkenyl groups which is substituted by one or more substituents including, for example, an amino group, a cyano group, a nitro group, a hydroxy group, halogen (e.g., chlorine, fluorine, bromine and iodine), a carboxy group or a carboxamido group

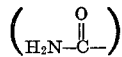

Illustrative of these acyl groups are acetyl, propionyl, acrylyl, crotoyl, 2-aminoacetyl, 3-chloropropionyl, 6-heptenoyl, adipoyl, 3-hydroxypropionoyl and 5-nitrohexanoyl.

Also included within the scope of the invention are those Δ³-cephalosporin esters wherein $R_1$ is an acyl group having the formula

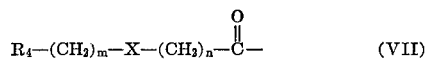

wherein $n$ is as previously described, $m$ is zero or an integer from 1 to 5, X is O or S and $R_4$ is $R_2$ (i.e., aryl, cycloalkyl or heterocyclic) as described above including substituted derivatives thereof and $R_3$ such as $C_1$ to $C_8$ alkyl or $C_2$ to $C_8$ alkenyl as described above with reference to $R_3$ including substituted derivatives thereof.

Representatives of the acyl groups defined by (VII) above include tert-butoxycarbonyl, tert-butoxyacetyl, ethoxyacetyl, tert-butylmercaptocarbonyl, tert-butylmercaptoacetyl, vinyloxyacetyl, allylmercaptoacetyl, 3-bromopropoxyacetyl, 3-hydroxypropylcarbonyl, 2-thienyloxyacetyl, piperidylmercaptoacetyl, 2-pyridyloxycarbonyl, phenoxyacetyl, naphthoxyacetyl, phenoxycarbonyl, aminophenoxyacetyl, beta-(phenoxy)-propionyl, cyclohexyloxyacetyl, chlorocyclopentyloxyacetyl, benzyloxyacetyl, phenylmercaptoacetyl, phenylbutoxyacetyl, phenylethylmercaptopropionyl and phenylmercaptoacetyl as well as a wide variety of others.

$R_1$ can further be an acyl group having the general formula

wherein Y is an amino group, a protected amino group, hydroxy, $C_1$ to $C_3$ alkoxy (e.g., methoxy, ethoxy, etc.) carboxyl or $C_1$ to $C_3$ alkanoyloxy (e.g., acetoxy, propionoxyl, etc.) and $R_5$ is one of the groups defined by $R_2$ above (i.e., aryl, heterocyclic and cycloalkyl) as described in detail above.

Representative of the foregoing acyl groups are 2-phenyl-2-aminoacetyl, 2-(p-methoxyphenyl)-2-aminoacetyl, 2-cyclohexyl-2-methoxyacetyl, 2-phenyl-2-acetoxy acetyl, 2-(2'-pyridyl)-2-hydroxyacetyl, 2-piperidyl-2-aminoacetyl, 2-(2'-pyridyl)-2-hydroxyacetyl, 2-piperidyl-2-aminoacetyl, 2-(2-thienyl)-2-acetoxyacetyl as well as a variety of others.

When using a starting material which contains a free amino group, such as 7-ADCA or a 7-acylamido desacetoxycephalosporanic acid ester containing a free amino group, it is generally desirable to employ the starting material in the form of a salt. For this purpose, it has been found that it is generally desirable to make use of a sulfonate salt of the starting material to be employed, such as tosylate salt, the salt of a naphthalene sulfonic acid, etc. The sulfonate salt is stable, easily handled and is soluble in the reaction mixture at the beginning of the reaction.

In addition to the foregoing, $R_1$ can be a number of other acyl groups including, for example, phenyl-a,a-dimethylacetyl and Q substituted derivatives thereof and a number of others. Various other suitable R acyl groups are disclosed in the Behrens et al. U.S. Pat. Nos. 2,479,-295, 2,479,297, 2,562,407 and 2,623,876.

Representative of suitable esters which can be converted to the corresponding 3-cephalosporin acids include the following compounds.

7-amino Δ³-desacetoxycephalosporanic acid p-nitrobenzyl ester
7-(allylmercaptomethylacetamido) Δ³-desacetoxycephalosporanic acid p-nitrobenzyl ester
7-phenylacetamido Δ³-desacetoxycephalosporanic acid p-nitrobenzyl ester
7-(gamma-chlorocrotylmercaptoacetamido) Δ³-desacetoxycephalosporanic acid p-nitrobenzyl ester
7-(n-butylmercaptoacetamido) Δ³-desacetoxycephalosporanic acid p-nitrobenzyl ester
7-(2',6'-dimethoxybenzamido) Δ³-desacetoxycephalosporanic acid p-nitrobenzyl ester
7-cyclohexylacetamido Δ³-desacetoxycephalosporanic acid p-nitrobenzyl ester
7-(cyclopentylbutyrylamido) Δ³-desacetoxycephalosporanic acid p-nitrobenzyl ester
7-(3'-pyridylacetamido) Δ³-desacetoxycephalosporanic acid p-nitrobenzyl ester
7-phenylmercaptoacetamido Δ³-desacetoxycephalosporanic acid p-nitrobenzyl ester
7-benzyloxyacetamido Δ³-desacetoxycephalosporanic acid p-nitrobenzyl ester
7-(4'-methylphenylbutyrylamido) Δ³-desacetoxycephalosporanic acid p-nitrobenzyl ester
7-(3'-isopropylbenzylmercaptoacetamido) Δ³-desacetoxycephalosporanic acid p-nitrobenzyl ester
7-benzylmercaptopropionamido Δ³-desacetoxycephalosporanic acid p-nitrobenzyl ester
7-phenylethylmercaptopropionamido Δ³-desacetoxycephalosporanic acid p-nitrobenzyl ester
7-phenylbutoxybutyrylamido Δ³-desacetoxycephalosporanic acid p-nitrobenzyl ester
7-(4'-fluorophenoxyacetamido) Δ³-desacetoxycephalosporanic acid p-nitrobenzyl ester
7-(3-bromophenylpropionamido) Δ³-desacetoxycephalosporanic acid p-nitrobenzyl ester
7-(phenyl-a,a-dimethylacetamido) Δ³-desacetoxycephalosporanic acid p-nitrobenzyl ester
7-(2'-phenyl-2'-aminoacetamido) Δ³-desacetoxycephalosporanic acid p-nitrobenzyl ester
7-(2'-thienylacetamido) Δ³-desacetoxycephalosporanic acid p-nitrobenzyl ester
7-(2'-nitrophenylmercaptoacetamido) Δ³-desacetoxycephalosporanic acid p-nitrobenzyl ester
7-(4'-cyanophenylpropionamido) Δ³-desacetoxycephalosporanic acid p-nitrobenzyl ester
7-(4'-trifluoromethylphenylacetamido) Δ³-desacetoxycephalosporanic acid p-nitrobenzyl ester
7-amino-3-methylthiomethyl Δ³-cephalosporanic acid p-nitrobenzyl ester
7-(2'-cyclohexylacetamido)-3-methoxymethyl Δ³-cephalosporanic acid p-nitrobenzyl ester
7-(3'-cyanophenylacetamido)-3-ethylthiomethyl Δ³-cephalosporanic acid p-nitrobenzyl ester.

The ester starting materials can be prepared in a number of ways. It is generally preferred to subject a penicillin sulfoxide p-nitrobenzyl ester to the Morin-Jackson ring expansion process to prepare the desacetoxy starting materials. Alternatively, 7-amino Δ³-desacetoxycephalosporanic acid p-nitrobenzyl ester, prepared by cleavage of the 7-acylamido group of a 7-acylamido Δ³-desacetoxycephalosporanic acid p-nitrobenzyl ester using the procedure of Chauvette described in copending application Ser. No. 651,662, filed July 7, 1967, can be acylated with the desired acyl group using conventional procedures to form a 7-acylamido Δ³-desacetoxycephalosporanic acid p-nitrobenzyl ester for ester cleavage in accordance with the process of this invention. The 3-alkylthiomethyl and 3-alkoxymethyl compounds are described in Belgian Pats. 719,710 and 734,532.

It is intended that the 7-acyl group of the products of the process of this invention will be cleaved by known procedures, and the resulting 7-amino compound reacylated in a conventional manner to produce the desired compound. For example, 7-phenoxyacetamido desacetoxycephalosporanic acid p-nitrobenzyl ester is prepared by subjecting penicillin V sulfoxide p-nitrobenzyl ester to the ring expansion process of Morin and Jackson, and can be treated in accordance with the process of this invention to form the corresponding acid which is deacylated and reacylated as illustrated below:

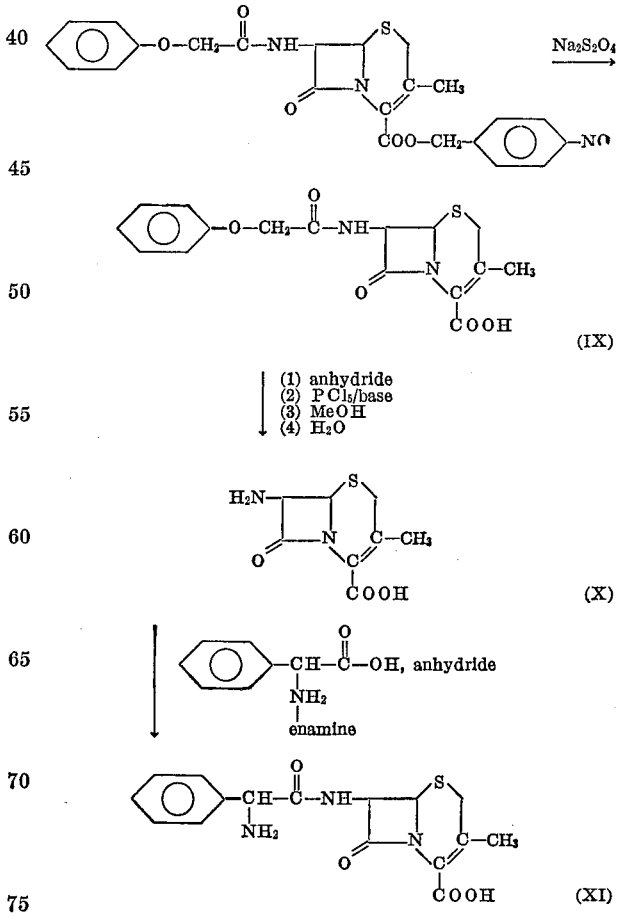

The enamine amino protecting group splits off as the product is acidified during recovery.

The product (XI) is an antibiotic disclosed and claimed in U.S. Pat. No. 3,507,861, 7-(2'-phenyl-2'-aminoacetamido)$\Delta^3$-desacetoxycephalosporanic acid, cephalexin.

Alternatively, since the process of this invention is likewise applicable to 7-amino $\Delta^3$-desacetoxycephalosporanic acid p-nitrobenzyl ester, the procedure described above can be varied by first cleaving the 7-phenoxyacetamido group to form the corresponding 7-amino $\Delta^3$-desacetoxycephalosporanic acid p-nitrobenzyl ester, followed by de-esterification according to this invention and reacylation.

Having described the basic concepts of this invention, reference is now made to the following examples which are provided by way of illustration, but not of limitation, of the practice of the invention.

EXAMPLE 1

The tosylate salt of 7-amino $\Delta^3$-desacetoxycephalosporanic acid p-nitrobenzyl ester (5.39 g., 10 mM.) is dissolved in 100 ml. of a mixture of equal volumes of acetonitrile and water, and the pH of the solution is adjusted to 7.5 by the addition of 1 N sodium hydroxide. After addition of sodium hydroxide, a portion of the solid ester precipitates from the solution to form a slurry.

To the resulting slurry, there is added over a period of a few minutes 5.2 g. (30 mM.) of sodium dithionite in 45 ml. of 1 N sodium hydroxide. The temperature of the solution rises from 21° C. to 31° C. during the addition, and the solids contained therein dissolve. After completion of the addition of the sodium dithionite, the mixture is stirred at ambient temperature for about 5 minutes, and the pH of the solution is adjusted to about 3.7 with concentrated HCl. The mixture is stirred at a pH of 3.7 for 15 minutes, and the solids thus formed are filtered off, washed with water, acetonitrile and acetone and vacuum dried at 40° C. There is obtained as the product 1.89 g. of 7-amino $\Delta^3$-desacetoxycephalosporanic acid in a purity of 98%.

EXAMPLE 2

A sample of 3.75 g. (5 mM.) of the tosylate salt of 7-(2'-phenyl-2'-aminoacetamido) $\Delta^3$-desacetoxycephalosporanic acid p-nitrobenzyl ester is stirred with 36 ml. of methanol, and 0.7 ml. of triethylamine is added to adjust the pH of the solution to above 7. Thereafter, 10 ml. of water is added followed by the addition of a solution of 2.6 g. (15 mM.) of sodium dithionite in 15 ml. of 1 N sodium hydroxide. During the addition of sodium dithionite, the temperature of the reaction mixture rises from 27° C. to 39° C., and the pH after addition of the dithionite is 8.9.

The mixture is then stirred and chilled to 5° C. to precipitate inorganic solids, which are filtered off and rinsed with a cool mixture of methanol and water (ratio of volume 3:2).

The pH of the filtrate is decreased to 4.2 by the addition of HCl, the methanol is removed by use of a rotary evaporator. 50 ml. of acetonitrile are added and the mixture is seeded with cephalexin crystals. 50 ml. more of acetonitrile are added and the resulting mixture is cooled for 2 hours in the refrigerator.

The resulting solids are filtered off, washed with a mixture of acetonitrile and water in a volume ratio of 4:1 and vacuum dried at 40° C. There is obtained 0.84 g. of 7-(2'-phenyl-2'-aminoacetamido $\Delta^3$-desacetoxycephalosporanic acid in a purity of 86.4%.

EXAMPLE 3

A sample of 7-phenylacetamido $\Delta^3$-desacetoxycephalosporanic acid p-nitrobenzyl ester is stirred in methanol, and piperidine is added to the resulting mixture to adjust the pH to greater than 7. Thereafter, a solution of potassium dithionite in 1 N potassium hydroxide is added to the mixture, and the resulting mixture is stirred for 15 minutes and cooled to about 5° C. Inorganic solids which are precipitated are filtered off, and the filtrate is adjusted to a pH of about 3 using concentrated HCl. Thereafter, the methanol is removed, and acetonitrile is added followed by cooling in a refrigerator for 1 hour.

The resulting solids are removed by filtration, washed and dried. The product is identified as 7-phenylacetamido $\Delta^3$-desacetoxycephalosporanic acid.

EXAMPLE 4

The p-nitrobenzyl ester of 7-(2'-phenoxypropionamido)-$\Delta^3$-desacetoxycephalosporanic acid is dissolved in ethanol, and triethylamine is added to raise the pH of the mixture to the alkaline side. Thereafter, a solution of sodium dithionite in 1 N sodium hydroxide is added to the mixture over a period of about 5 minutes, during which the temperature rises from about 25° C. to 32° C.

The reaction mixture is then cooled to facilitate removal of inorganic solids and the resulting supernatant liquid is acidified with HCl. The product is then separated in the manner described in Example 2, and identified as 7-(2'-phenoxypropionamido) $\Delta^3$-desacetoxycephalosporanic acid.

EXAMPLE 5

A sample of 7-(2'-thienylacetamido) $\Delta^3$-desacetoxycephalosporanic acid p-nitrobenzyl ester is dissolved in a mixture of acetonitrile and water, and the pH is adjusted to 8.3 by the addition of sodium hydroxide. Thereafter, a solution of sodium dithionite in sodium hydroxide is added to the reaction mixture, and the temperatures rises to about 37° C.

Inorganic solids are separated in the manner described in Example 2, and the filtrate is acidified to precipitate the product, which is identified as 7-(2'-thienylacetamido) $\Delta^3$-desacetoxycephalosporanic acid.

EXAMPLE 6

The procedure described in Example 2 is repeated using as the starting material 7-(allylmercaptomethylacetamido) $\Delta^3$-desacetoxycephalosporanic acid p-nitrobenzyl ester.

The product is identified as 7-(allylmercaptomethylacetamido) $\Delta^3$-desacetoxycepholosporanic acid, and is separated from the reaction mixture in the manner described in good yields.

EXAMPLE 7

The procedure of Example 2 is again repeated using as the starting material the p-nitrobenzyl ester of 7-(2'-6'-dimethoxyphenoxyacetamido) $\Delta^3$-desacetoxycephalosporanic acid. The corresponding acid is obtained in good yield.

EXAMPLE 8

The procedure of Example 1 is repeated using as the starting material 7-(2'-cyclohexylpropionamido) $\Delta^3$-desacetoxycephalosporanic acid p-nitrobenzyl ester. The corresponding acid, 7-(2'-cyclohexylpropionamido) $\Delta^3$-desacetoxycephalosporanic acid is obtained in good yield.

EXAMPLE 9

The procedure described in Example 1 is repeated using as the starting material 7-butyrylacetamido $\Delta^3$-desacetoxycephalosporanic acid p-nitrobenzyl ester. The corresponding acid is obtained in good yield.

EXAMPLE 10

Using the procedure of Example 2, 7-amino-3-methoxymethyl-$\Delta^3$-cephalosporanic acid p-nitrobenzyl ester is dissolved in methanol and triethyleneamine is added to adjust the pH of the resulting mixture to above 7. Thereafter, potassium dithionite is added and the temperature of the reaction mixture rises from 25° to 34° C.

The mixture is then stirred and chilled to 5° C. to precipitate inorganic solids which are filtered off. The filtrate is then acidified and the product removed in accordance with the procedure described in Example 2. The product, 7-amino - 3 - methoxymethyl-Δ³-cephalosporanic acid, is obtained in good yield.

EXAMPLE 11

The procedure of Example 10 is repeated using as the starting material the p-nitrobenzyl ester of 7-phenoxyacetamido - 3 - methylthiomethyl-Δ³-cephalosporanic acid. The dithionite is sodium dithionite, and 7-phenoxyacetamido - 3 - methylthiomethyl-Δ³-cephalosporanic acid is obtained in good yield.

EXAMPLE 12

The procedure of Example 10 is repeated using as the starting material the p-nitrobenzyl ester of 7-(2'-thienylacetamido) - 3 - methoxymethyl - Δ³ - cephalosporanic acid. The corresponding acid is obtained in good yield.

EXAMPLE 13

The procedure of Example 10 is again repeated using as the starting material the p-nitrobenzyl of 7-phenylmercaptoacetamido - 3 - methylthiomethyl-Δ³-cephalosporanic acid. Again, the corresponding acid is obtained in good yield.

EXAMPLE 14

Using the procedure described in Example 10, 7-(3'-cyclohexylpropionamido) - 3 - methylthiomethyl-Δ³-cephalosporanic acid p-nitrobenzyl ester is reacted with sodium dithionite to obtain the corresponding acid in good yield.

EXAMPLE 15

The procedure of Example 10 is repeated using as the starting material 7-benzylmercaptopropionamido-3-methylthiomethyl-Δ³-cephalosporanic acid p-nitrobenzyl ester which is reacted with potassium dithionite to form the corresponding acid which is obtained in good yield.

EXAMPLE 16

Using the procedure described in Example 10, 7-(3'-pyridylpropionamido) - 3 - ethoxymethyl-Δ³-cephalosporanic acid is reacted with potassium dithionite to form the corresponding acid which is obtained in good yield.

It will be understood that various changes and modifications can be made in the details of formulation, procedure and use without departing from the spirit of the invention, especially as defined in the following claims.

I claim:

1. A process for converting a p-nitrobenzyl ester of an acid selected from the group consisting of a Δ³-desacetoxycephalosporanic acid, a 3-alkoxymethyl Δ³-cephalosporanic acid and a 3-alkylthiomethyl Δ³-cephalosporanic acid to the corresponding acid comprising reacting an ester having the formula

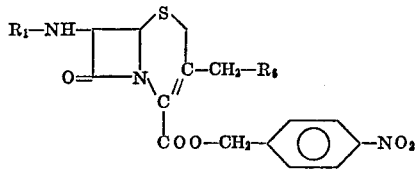

wherein $R_1$ is selected from the group consisting of hydrogen and an acyl group, and $R_6$ is selected from the group consisting of hydrogen, $C_1$ to $C_6$ alkylthio and $C_1$ to $C_6$ alkoxy with an alkali metal dithionite salt at a pH greater than 7.

2. A process as defined in claim 1 wherein the reaction is carried out in the presence of a base selected from the group consisting of alkali metal hydroxides and secondary and tertiary amines.

3. A process as defined in claim 1 wherein the reaction is carried out at a temperature within the range of —20° to 100° C.

4. A process as defined in claim 1 wherein the dithionite is employed in an amount of at least one mole of dithionite per mole of the ester.

5. A process as defined in claim 1 wherein R is an acyl group from the group consisting of (1) an acyl group having the formula

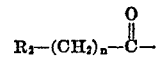

wherein $n$ is zero or an integer from 1 to 6 and $R_2$ is selected from the group consisting of monocyclic carbocyclic and bicyclic carbocyclic aryl containing 6–14 carbon atoms, cycloalkyl containing 4–8 carbon atoms and heterocyclic groups wherein the hetero atom is selected from the group consisting of O, S, N and combinations thereof, and substituted derivatives thereof wherein the substituent is selected from the group consisting of $C_1$ to $C_3$ alkyl, $C_1$ to $C_3$ alkoxy, cyano, nitro, hydroxy halogen, trifluoromethyl, carboxy, amino, $C_1$ to $C_4$ carboxyalkyl and carboxamidoalkyl; (2) an acyl group having the formula

wherein $R_3$ is selected from the group consisting of $C_1$ to $C_8$ alkyl, $C_2$ to $C_8$ alkenyl and substituted derivatives thereof wherein the substituent is selected from the group consisting of amino, cyano, nitro, hydroxy, halogen, carboxy and carboxamido; (3) an acyl group having the formula

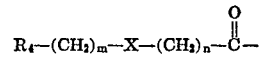

wherein $n$ has the meaning set forth above, $m$ is zero or an integer from 1 to 5, X is O or S and $R_4$ is selected from the group consisting of $R_2$ and $R_3$; (4) an acyl group having the formula

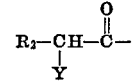

wherein $R_2$ has the meaning defined above and Y is selected from the group consisting of amino, protected amino, hydroxy, $C_1$ to $C_3$ alkoxy, carboxyl, and $C_1$ to $C_3$ alkanoyloxy; and (5) phenyl-a,a-dimethylacetyl and substituted derivatives thereof wherein the substituent is selected from the group consisting of $C_1$ to $C_3$ alkyl, $C_1$ to $C_3$ alkoxy, cyano, nitro, hydroxy halogen, trifluoromethyl, carboxy, amino, $C_1$ to $C_4$ carboxyalkyl and carboxamidoalkyl.

6. A process as defined in claim 1 wherein the dithionite is sodium dithionite.

7. A process as defined in claim 1 wherein the ester is 7-amino Δ³-desacetoxycephalosporanic acid p-nitrobenzyl ester.

8. A process as defined in claim 1 wherein the ester is 7-(2'-phenyl - 2' - amino-acetamido) Δ³-desacetoxycephalosporanic acid p-nitrobenzyl ester.

References Cited

UNITED STATES PATENTS 3,632,850    1/1972    Garbrecht _____ 260—239.1

NICHOLAS S. RIZZO, Primary Examiner

U.S. Cl. X.R.

424—246